(12) United States Patent
Acero Acero et al.

(10) Patent No.: US 10,952,287 B2
(45) Date of Patent: Mar. 16, 2021

(54) INDUCTION HOB DEVICE AND A METHOD FOR MANUFACTURING AN INDUCTION HOB DEVICE

(71) Applicant: BSH Hausgeräte GmbH, Munich (DE)

(72) Inventors: Jesus Acero Acero, Saragossa (ES); Claudio Carretero Chamarro, Saragossa (ES); Sergio Llorente Gil, Saragossa (ES); Ignacio Lope Moratilla, Saragossa (ES); Maria Elena Moya Albertin, Saragossa (ES); Daniel Palacios Tomas, Saragossa (ES); Javier Serrano Trullen, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 250 days.

(21) Appl. No.: 16/060,048

(22) PCT Filed: Nov. 24, 2016

(86) PCT No.: PCT/IB2016/057104
§ 371 (c)(1),
(2) Date: Jun. 7, 2018

(87) PCT Pub. No.: WO2017/109609
PCT Pub. Date: Jun. 29, 2017

(65) Prior Publication Data
US 2018/0359820 A1 Dec. 13, 2018

(30) Foreign Application Priority Data
Dec. 22, 2015 (ES) .................................. 201531884

(51) Int. Cl.
H05B 6/12 (2006.01)

(52) U.S. Cl.
CPC ....... *H05B 6/1272* (2013.01); *H05B 2213/03* (2013.01); *Y02B 40/00* (2013.01)

(58) Field of Classification Search
CPC . H05B 2213/03; H05B 6/1272; Y02B 40/126
(Continued)

(56) References Cited

U.S. PATENT DOCUMENTS 5,872,351 A * 2/1999 Sowerby .................. A21B 1/02
219/621
6,144,019 A * 11/2000 Garcia ................. H05B 6/1281
219/624
(Continued)

FOREIGN PATENT DOCUMENTS

CN 2679958 Y 2/2005
DE 102013214434 A1 * 3/2014 ............ F24C 15/102
(Continued)

OTHER PUBLICATIONS

16060048_2020-04-08_EP_1858300_A1_M.pdf; EP1858300A1_translation.pdf (Year: 2007).*
(Continued)

*Primary Examiner* — Dana Ross
*Assistant Examiner* — Ket D Dang
(74) *Attorney, Agent, or Firm* — Michael E. Tschpp; Andre Pallapies; Brandon G. Braun

(57) ABSTRACT

An induction hob device comprising at least one cooktop, at least one first inductor having at least one first coil portion and at least one further first coil portion, and at least one second inductor having at least one second coil portion. In order to improve efficiency, it is proposed that the second coil portion is at least partly located between the first coil portion and the further first coil portion.

19 Claims, 9 Drawing Sheets

(58) Field of Classification Search
USPC ....... 219/624, 622, 623, 675, 662, 671, 676,
219/626, 627, 667, 672, 677; 336/220,
336/232, 222, 223; 426/552, 94, 138,
426/496, 505, 5, 523; 99/373, 374,
99/443 C, 372, 422, 451, DIG. 14, 326,
99/334, 338, 340, 353, 354, 356, 385,
99/426, 432, 428, 442, 445; 148/526,
148/529, 569, 585, 510, 566, 567
See application file for complete search history.

(56) References Cited

U.S. PATENT DOCUMENTS

| | | | | |
|---|---|---|---|---|
| 2001/0007323 | A1* | 7/2001 | Clothier | H05B 6/06 |
| | | | | 219/621 |
| 2012/0097664 | A1* | 4/2012 | Kataoka | H05B 6/1263 |
| | | | | 219/632 |
| 2014/0076886 | A1* | 3/2014 | Stella | H05B 6/062 |
| | | | | 219/625 |
| 2015/0245420 | A1* | 8/2015 | Peterson | A47J 37/0658 |
| | | | | 99/358 |

FOREIGN PATENT DOCUMENTS

| | | | |
|---|---|---|---|
| DE | 102013214434 A1 | 3/2014 | |
| EP | 1858300 A1 * | 11/2007 | ........... H05B 6/1245 |
| EP | 1858300 A1 | 11/2007 | |
| GB | 2389767 A | 12/2003 | |

OTHER PUBLICATIONS

DE102013214434A1_translation.pdf (Year: 2014).*
International PCT/IB2016/057104 dated Feb. 3, 2017.
National Search Report ES 201531884 dated Dec. 15, 2016.

* cited by examiner

INDUCTION HOB DEVICE AND A METHOD FOR MANUFACTURING AN INDUCTION HOB DEVICE

CROSS-REFERENCES TO RELATED APPLICATIONS

This application is the U.S. National Stage of International Application No. PCT/IB2016/057104, filed Nov. 24, 2016, which designated the United States and has been published as International Publication No. WO 2017/109609 A1 and which claims the priority of Spanish Patent Application, Serial No. P201531884, filed Dec. 22, 2015, pursuant to 35 U.S.C. 119(a)-(d).

BACKGROUND OF THE INVENTION

The invention relates to an induction hob.

It is known to use induction hobs comprising at least one cooktop and several inductors which are located below the cooktop. Thereby, the inductors are located in-plane and distanced from each other.

BRIEF SUMMARY OF THE INVENTION

The objective of the invention is, in particular, to provide a generic induction hob device with improved characteristics regarding an efficiency.

The invention relates to an induction hob device comprising at least one, preferably exactly one, cooktop, at least one first inductor having at least one, preferably exactly one, first coil portion and at least one, preferably exactly one, further first coil portion and advantageously at least one first connection portion which electrically connects the first coil portion and the further first coil portion, and at least one second inductor having at least one, preferably exactly one, second coil portion.

It is proposed that the second coil portion is at least partly located between the first coil portion and the further first coil portion, preferably at least when seen in a direction perpendicular to a main extension plane of the cooktop. A "main extension plane" of an object, is to be understood, in particular, as a plane which is parallel to a largest side and/or face of a smallest, in particular imagined, in particular geometric, cuboid, which encloses the object just completely and preferably intersects a center, in particular a geometric center, of the cuboid.

An "induction hob device" is to be understood, in particular, at least as a part, in particular a subassembly, of an induction hob. Moreover, the induction hob device may, in particular, also comprise the entire induction hob. Preferably, the induction hob device comprises a plurality of inductors, in particular at least four, advantageously at least six, more advantageously at least twelve and most advantageously at least twenty-four inductors. Hence, the induction hob device preferably is formed as a matrix-hob device and/or a flexible hob device.

An "inductor" is to be understood, in particular, as a heating unit, which is provided to convert energy, in particular electrical energy, into heat, preferably for the purpose of supplying a cooking utensil. Advantageously, the inductor is provided to generate an alternating electromagnetic field, which is converted into heat in a bottom of a cooking utensil by means of eddy currents and/or magnetization and demagnetization effects. For this purpose, the inductor comprises at least one coil portion. In this context, a "coil portion" is to be understood, in particular, as an inductive element, which preferably is formed by at least one wire, in particular heating wire. The coil portion, in particular, comprises at least one winding and preferably several windings like at least two, at least five, at least ten and/or at least fifteen windings, in particular located in one layer and/or preferably in several layers. "Provided" is to be understood, in particular, as specifically designed and/or equipped. By an object being provided for a certain function, it is in particular to be understood that the object fulfills and/or implements this certain function in at least one application state and/or operating state.

By the expression that "an object is at least partly located between two further objects at least when seen in a direction perpendicular to a main extension plane of the cooktop", it is to be understood, in particular, that at least one line exists which is perpendicular to the main extension plane of the cooktop and intersects the object and the further objects. In addition, the induction hob device may, in particular, comprise at least one retainer unit, which is, in particular, provided to retain and/or support at least one coil portion, in particular at least the first coil portion, the further first coil portion and/or the second coil portion, and/or a control unit which is in particular provided to operate the inductors. By the implementation according to the invention, an induction hob device can be obtained, in particular, having improved characteristics regarding an efficiency, in particular a power efficiency, an installation space efficiency, a component efficiency and/or a cost efficiency. Additionally, a flexibility can be advantageously increased. Thereby, in particular an improved distribution and/or arrangement of the inductors may be obtained, which, in particular, leads to a particularly uniform power distribution by which an advantageous thermal distribution in the bottom of a cooking utensil may be achieved. In addition, in particular an improved coverage resolution, in particular with respect to a cooking utensil placed on the cooktop, may be obtained by which, in particular, a flexibility can be further increased. Thereby, in particular a distance between centers of the inductors can be reduced to a minimum and/or a diameter of the inductors can be increased while a distance between the centers can be kept constant.

Preferably, the first coil portion at least substantially covers the further first coil portion at least in a direction perpendicular to the cooktop and/or at least when seen in the direction perpendicular to the main extension plane of the cooktop. In this case, the first coil portion, in particular, is located above the further first coil portion with respect to the cooktop. By the expression that an object "at least substantially covers" a further object at least in a direction perpendicular to the cooktop, it is to be understood, in particular, that at least 90%, advantageously at least 93%, more advantageously at least 96% and particularly advantageously at least 99% of all lines, which emanate from the object and are perpendicular to the main extension plane of the cooktop, intersect the further object. Particularly advantageously, the first coil portion and the further first coil portion comprise a same diameter and are preferably at least substantially identical. In this context, a "diameter" of an object is supposed to refer, in particular, to a diameter of a smallest, in particular imagined, circuit, which encloses the object just completely. The term "at least substantially identical" is to be understood, in particular, as identical apart from manufacturing tolerances and/or within the limits of standardized tolerances and/or within the limits of manufacturing possibilities. As a result, in particular a particularly simple construction may be obtained. Moreover, advantageously magnetic interferences and/or magnetic disturbances may be reduced.

Moreover, it is proposed that the second coil portion is substantially displaced with respect to the first coil portion and/or the further first coil portion at least in a direction parallel to the cooktop and/or at least when seen in the direction perpendicular to the main extension plane of the cooktop. By the expression that an object is "substantially displaced" with respect to a further object at least in a direction parallel to the cooktop, it is to be understood, in particular, that at most 85%, advantageously at most 80% and more advantageously at most 75% of all lines, which emanate from the object and are perpendicular to the main extension plane of the cooktop, intersect the further object. Preferably, the second coil portion is arranged with respect to the first coil portion and/or the further first coil portion in such a way that a center, in particular a geometric center, of the second coil portion is distanced from an outer border of the first coil portion and/or the further first coil portion at least when seen in the direction perpendicular to the main extension plane of the cooktop. Particularly advantageously, an overlapping area between the second coil portion and the first coil portion and/or the further first coil portion amounts to at least 5%, preferably at least 10% and more preferably at least 15%, and at most 45%, preferably at most 40% and more preferably at most 35%, of a total surface area of the second coil portion at least when seen in the direction perpendicular to the main extension plane of the cooktop. By that, in particular a distribution and/or an arrangement of the inductors can be optimized.

If the second coil portion is located directly adjacent to the first coil portion and/or to the further first coil portion, in particular at least when seen in the direction parallel to the main extension plane of the cooktop, a particularly compact induction hob device may be obtained. By the expression that two coil portions are "directly adjacent", it is to be understood, in particular, that no other coil portion is located between the two coil portions.

A particularly cost efficient and/or simple construction may in particular be obtained, if the first coil portion, the further first coil portion and the second coil portion are at least substantially identical.

Additionally, it is proposed that the induction hob device comprises at least one third inductor having at least one third coil portion, which is located at least partly between the second coil portion and a further second coil portion of the second inductor, preferably at least when seen in the direction perpendicular to the main extension plane of the cooktop. In this case, the second inductor advantageously comprises at least one second connection portion which electrically connects the second coil portion and the further second coil portion. Preferably, the second coil portion at least substantially covers the further second coil portion at least in the direction perpendicular to the cooktop and/or at least when seen in the direction perpendicular to the main extension plane of the cooktop. Preferably, the second coil portion and the further second coil portion thereby comprise a same diameter and are preferably at least substantially identical. Preferably, the third coil portion is located directly adjacent to the second coil portion and/or the further second coil portion. Moreover, advantageously the third coil portion is substantially displaced with respect to the first coil portion, the further first coil portion, the second coil portion and/or the further second coil portion at least in the direction parallel to the cooktop and/or at least when seen in the direction perpendicular to the main extension plane of the cooktop. Preferably, the third coil portion is arranged with respect to the first coil portion, the further first coil portion, the second coil portion and/or the further second coil portion in such a way that a center, in particular a geometric center, of the third coil portion is distanced from an outer border of the first coil portion, the further first coil portion, the second coil portion and/or the further second coil portion at least when seen in the direction perpendicular to the main extension plane of the cooktop. Particularly advantageously, an overlapping area between the third coil portion and the first coil portion and/or the further first coil portion amounts to at least 5%, preferably at least 10% and more preferably at least 15%, and at most 45%, preferably at most 40% and more preferably at most 35%, of a total surface area of the third coil portion at least when seen in the direction perpendicular to the main extension plane of the cooktop. Furthermore, advantageously an overlapping area between the third coil portion and the second coil portion and/or the further second coil portion amounts to at least 5%, preferably at least 10% and more preferably at least 15%, and at most 45%, preferably at most 40% and more preferably at most 35%, of a total surface area of the third coil portion at least when seen in the direction perpendicular to the main extension plane of the cooktop. As a result, in particular an advantageously dense distribution and/or arrangement of inductors can be achieved. Hence, in particular a uniform power distribution, in particular over an entire extension of the cooktop, can be obtained.

Further, it is proposed that the induction hob device comprises a retainer unit, in particular the retainer unit mentioned before, having at least three at least substantially identical retainer elements, preferably retainer plates and more preferably printed circuit boards and/or printed circuit board-substrates, on each of which at least one of the coil portions, in particular the first coil portion, the further first coil portion, the second coil portion, the further second coil portion and/or the third coil portion, is located, wherein the retainer elements are flipped, rotated and/or displaced relative to each other. Thereby, in particular a particularly efficient manufacturing process may be achieved. Moreover, costs may be advantageously reduced. Moreover, in particular the use of PCB-technology allows implementing a connection between coil portions without increasing a thickness of the inductors.

In a preferred embodiment of the invention, it is proposed that the inductors, in particular at least the first inductor and the second inductor and preferably the third inductor, comprise an at least substantially equal effective distance to the cooktop. In this context, an "effective distance to the cooktop", is to be understood, in particular, as a distance which corresponds to an arithmetic mean of distances which is in particular obtained by adding up the distances of all coil portions of one inductor to the cooktop and dividing the result by the number of coil portions. Moreover, by an "at least substantially equal effective distance", it is to be understood, in particular, that an effective distance of an inductor differs from an effective distance of a further inductor by at most 10%, preferably at most 7.5% and more preferably at most 5%. Thus, in particular an advantageously uniform heat distribution and/or thermal distribution, in particular in a cooking utensil, may be obtained. Further, in particular, equivalent inductors can be obtained.

Additionally, it is proposed that the induction hob device comprises a control unit which is provided to operate the inductors, in particular at least the first inductor and the second inductor and preferably the third inductor, alternately. By that, advantageously magnetic interferences and/or magnetic disturbances can be effectively reduced.

A particularly high flexibility and/or a particularly easy accessibility may in particular be obtained, if the first inductor comprises at least one first terminal and the second inductor comprises at least one second terminal, wherein the terminals are accessible from a same side. Particularly preferably, all terminals of all inductors are accessible from a same side.

Further, the invention relates to a method for manufacturing an induction hob device, wherein the induction hob device comprises at least one, preferably exactly one, cooktop, at least one first inductor having at least one, preferably exactly one, first coil portion and at least one, preferably exactly one, further first coil portion and advantageously at least one first connection portion which electrically connects the first coil portion and the further first coil portion, and at least one second inductor having at least one, preferably exactly one, second coil portion.

It is proposed that the second coil portion is at least partly located between the first coil portion and the further first coil portion, preferably at least when seen in a direction perpendicular to a main extension plane of the cooktop. By that, in particular an efficiency, in particular a power efficiency, an installation space efficiency, a component efficiency and/or a cost efficiency, and/or a flexibility can be advantageously increased. Moreover, in particular an improved distribution and/or arrangement of the inductors may be obtained, which, in particular, leads to a particularly uniform power distribution by which an advantageous thermal distribution in the bottom of a cooking utensil may be achieved.

The induction hob device is herein not limited to the application and implementation described above. In particular, for the purpose of fulfilling a functionality herein described, the induction hob device can comprise a number of respective elements, structural components and units that differs from the number mentioned herein.

Further advantages of the invention may be derived from the description of the figures below. The figures show nine exemplary embodiments of the invention. The figures, the description and the claims contain numerous features in combination. The features may also be considered individually, and may be combined into useful further combinations.

BRIEF DESCRIPTION OF THE DRAWINGS

It is shown in.

DETAILED DESCRIPTION OF EXEMPLARY EMBODIMENTS OF THE PRESENT INVENTION

Figure 1:
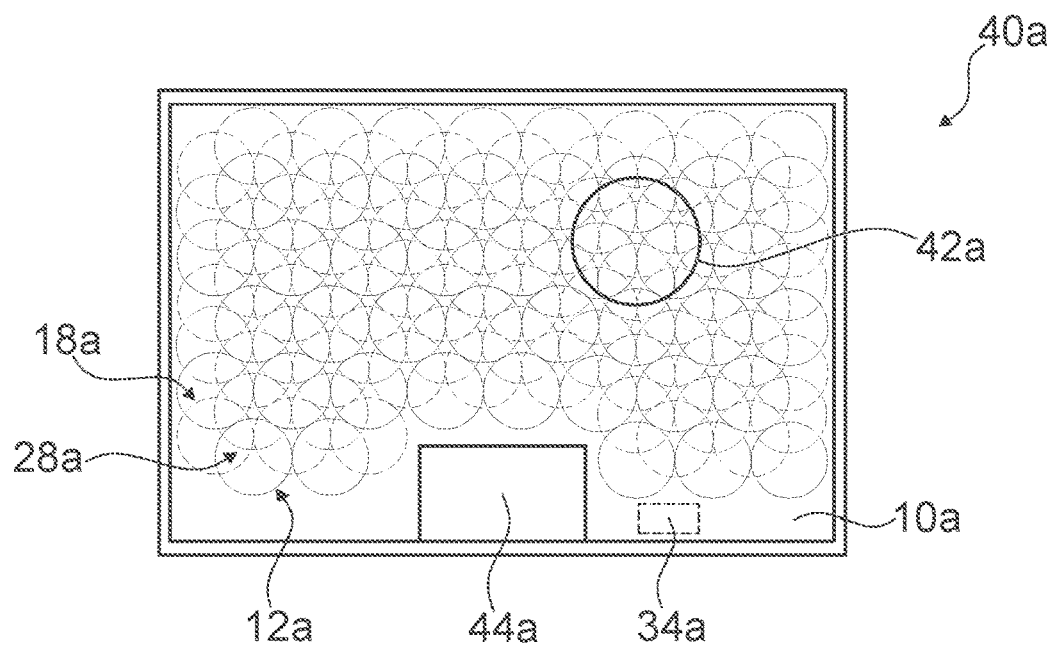
FIG. 1 a simplified schematic top view of an induction hob comprising an induction hob device having a cooktop and several first inductors, second inductors and third inductors, FIG. 2 an enlarged view of the first inductors, the second inductors and the third inductors, FIG. 3 an exploded view of the first inductors, the second inductors and the third inductors, FIG. 4 a simplified schematic side view of one first inductor of the first inductors, one second inductor of the second inductors and one third inductor of the third inductors, FIG. 5 a simplified schematic view of a connection type between two coil portions of one of the inductors, FIG. 6 a perspective view of a retainer element of a retainer unit of the induction hob device, FIG. 7 several stacked retainer elements of the retainer unit, FIG. 8 a simplified schematic view of an arrangement of connection portions used to connect coil portions of the inductors, FIG. 9 an exploded view of the first inductors, the second inductors and the third inductors showing an arrangement of terminals of the inductors, FIG. 10 a simplified schematic side view of the terminals of the inductors, FIG. 11 a simplified schematic view of a cooking utensil which is placed on the cooktop, FIG. 12 a first operational state of a control scheme used to supply the cooking utensil, FIG. 13 a second operational state of a control scheme used to supply the cooking utensil, FIG. 14 a third operational state of a control scheme used to supply the cooking utensil, FIG. 15 a simplified schematic side view of a first inductor and a second inductor of a further induction hob device, FIG. 16 a simplified schematic top view of a further induction hob device, FIG. 17 a simplified schematic top view of a further induction hob device, FIG. 18 a simplified schematic top view of a further induction hob device, FIG. 19 a simplified schematic top view of a further induction hob device, FIG. 20 a simplified schematic top view of a further induction hob device, FIG. 21 a simplified schematic top view of a further induction hob device and FIG. 22 a simplified schematic top view of a further induction hob device.

FIG. 1 shows a top view of an exemplary induction hob 40a. In the present case, the induction hob 40a is formed as a matrix-hob and/or a flexible hob. The induction hob 40a comprises an induction hob device. The induction hob device comprises a cooktop 10a. The cooktop 10a is adjustable and comprises flexible and/or changeable heating zones. The cooktop 10a and/or heating zones are provided to heat at least one cooking utensil 42a. Alternatively, it is conceivable that an induction hob device comprises two, four and/or six, in particular non-flexible, heating zones.

The induction hob device further comprises an operating interface 44a. The operating interface 44a is provided for controlling an operation of the induction hob 40a and/or of the induction hob device, in particular by entering and/or choosing at least one parameter like a heating power, a heating density, a heating stage and/or a heating zone.

Moreover, the induction hob device comprises a control unit 34a. The control unit 34a comprises a processor unit, a memory unit and an operating program which is stored in the memory unit and executed by the processor unit. The control unit 34a is provided for controlling a cooking process.

Figure 2:
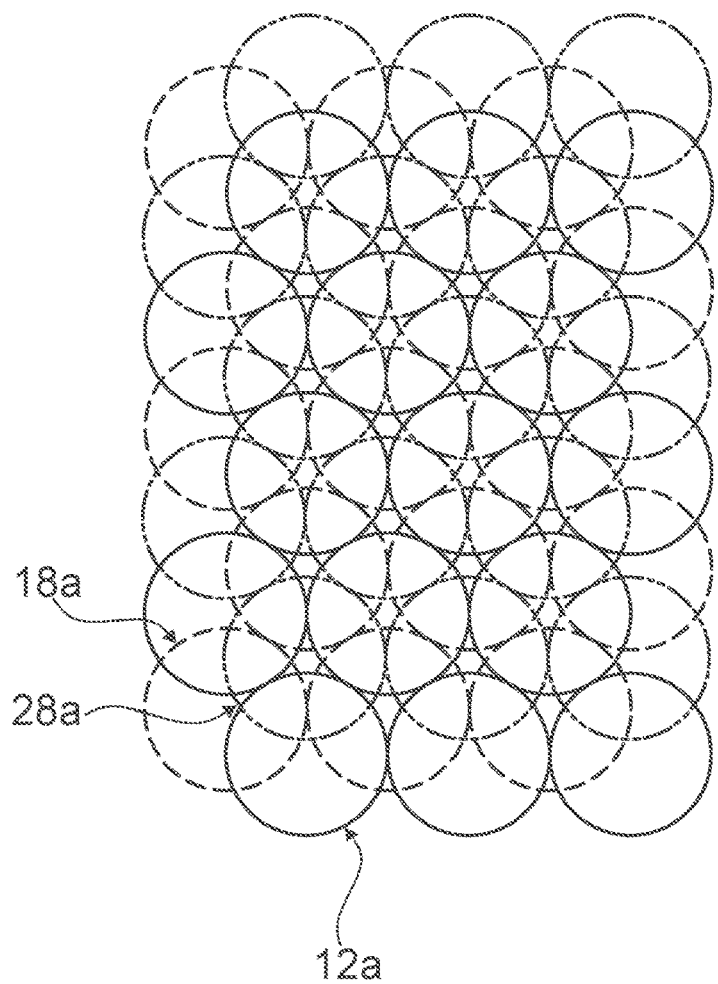
Figure 3:
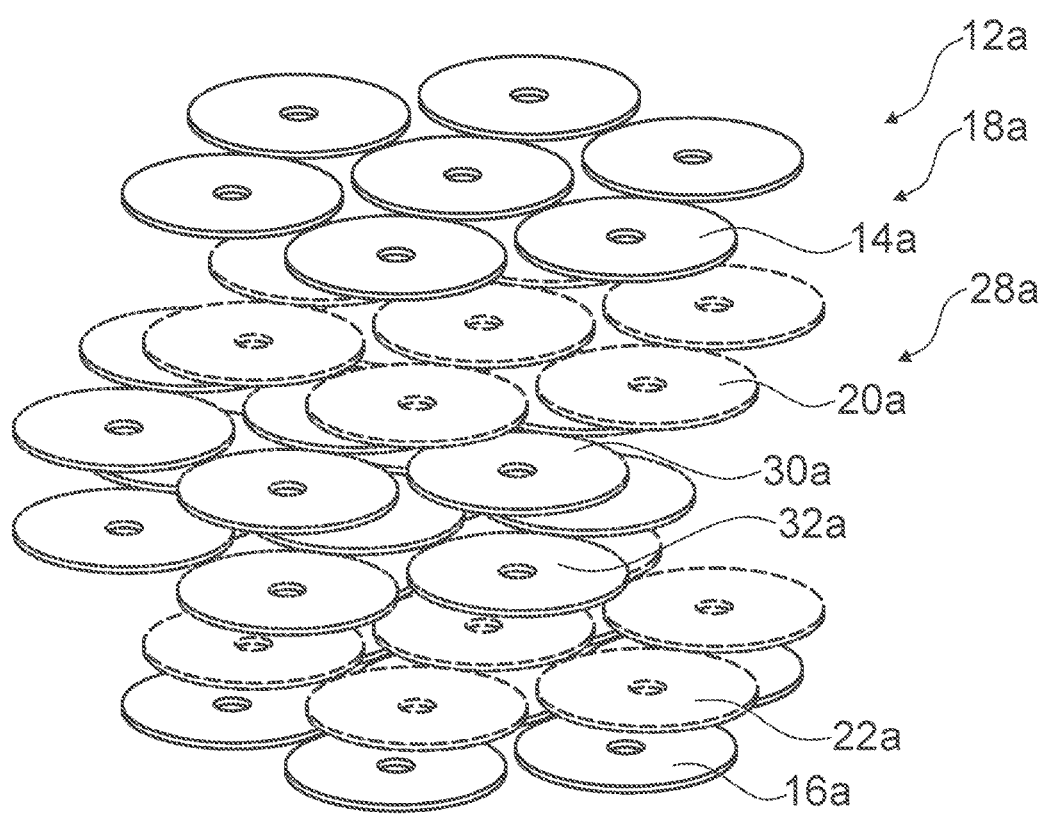
Figure 4:
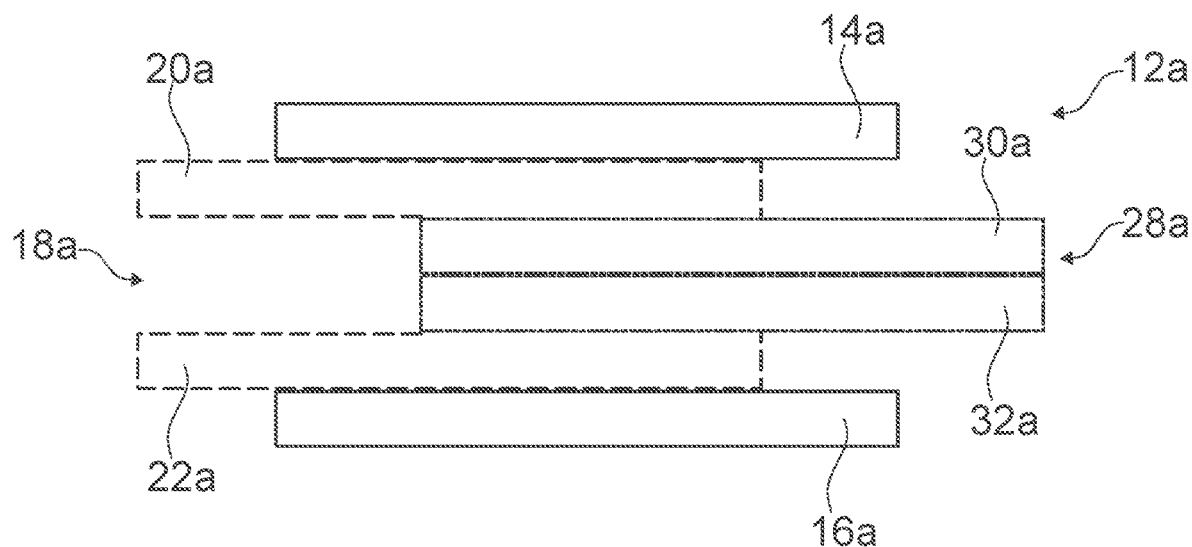

The induction hob device further comprises at least one inductor 12a, 18a, 28a. In the present case, the induction hob device comprises a plurality of inductors 12a, 18a, 28a, here in particular between 48 and 144 inductors 12a, 18a, 28a, wherein for simplicity, in particular in FIGS. 1 to 3 merely three of the inductors 12a, 18a, 28a are provided with reference numbers. The inductors 12a, 18a, 28a are located below the cooktop 10a. The inductors 12a, 18a, 28a correspond to heating units. The inductors 12a, 18a, 28a are provided to create the, in particular flexible, heating zones. The inductors 12a, 18a, 28a are provided for generating an alternating electromagnetic field, which is converted into heat in a bottom of the cooking utensil 42a by means of eddy currents and/or magnetization and demagnetization effects.

In the present case, the induction hob device comprises three groups of inductors 12a, 18a, 28a, wherein the inductors 12a, 18a, 28a, which are assigned to the different groups, are at least partly different to each other, in particular differently constructed and/or arranged, in particular in a direction perpendicular to a main extension plane of the cooktop 10a. Moreover, each group comprises a same number of inductors 12a, 18a, 28a. Thereby, all inductors 12a, 18a, 28a in one group are at least substantially identical. In the present case, the inductors 12a, 18a, 28a of the different groups, in particular directly adjacent inductors 12a, 18a, 28a at least when seen in a direction perpendicular to the main extension plane of the cooktop 10a, interleave each other, in particular at least when seen in the direction perpendicular to the main extension plane of the cooktop 10a. As an alternative, it is conceivable that an induction hob device comprises two groups, four groups, five groups and/or six groups of, in particular differently constructed and/or arranged, inductors. Moreover, a number of inductors in each group may differ from each other.

In the following, merely one inductor 12a, 18a, 28a of each group, in particular inductors 12a, 18a, 28a, which are located directly adjacent to each other at least when seen in the direction perpendicular to the main extension plane of the cooktop 10a, are described in more detail. Thereby, the following description can also be applied to the further inductors 12a, 18a, 28a, in particular due to the at least substantially identical construction of the inductors 12a, 18a, 28a at least with respect to the different groups of inductors 12a, 18a, 28a.

Figure 5:
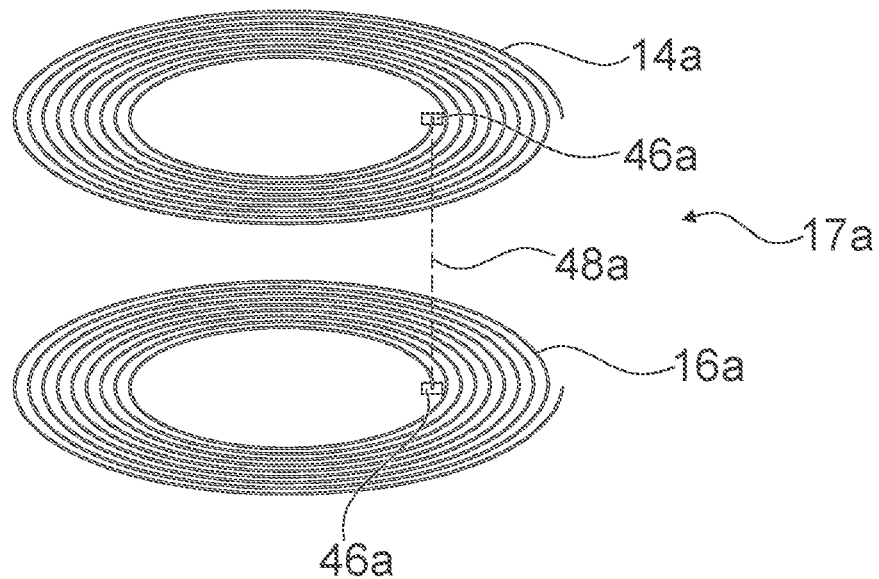

The induction hob device comprises a first inductor 12a. The first inductor 12a is assigned to a first group of the groups of inductors 12a, 18a, 28a. The first inductor 12a comprises a first coil portion 14a. The first coil portion 14a is formed as a spiral coil. The first coil portion 14a is at least substantially circular at least when seen in the direction perpendicular to the main extension plane of the cooktop 10a. The first coil portion 14a comprises seven windings in one layer. The first coil portion 14a is located directly adjacent to the cooktop 10a. As an alternative, it is conceivable that a first coil portion comprises an arbitrary other number of windings and/or layers. Moreover, a first coil portion might be formed as a solenoid. Moreover, the first inductor 12a comprises a further first coil portion 16a. The further first coil portion 16a is formed as a spiral coil. The further first coil portion 16a is at least substantially circular at least when seen in the direction perpendicular to the main extension plane of the cooktop 10a. The further first coil portion 16a comprises seven windings in one layer. The further first coil portion 16a is at least substantially identical to the first coil portion 14a. In the present case, the further first coil portion 16a is flipped and/or mirrored relative to the first coil portion 14a, in particular with respect to a plane which is parallel to the main extension plane of the cooktop 10a, in particular in order to maintain a sense of a current flow. The further first coil portion 16a is located below the first coil portion 14a, in particular with respect to the cooktop 10a. Thereby, the further first coil portion 16a is at least substantially covered by the first coil portion 14a at least in a direction perpendicular to the cooktop 10a and/or at least when seen in the direction perpendicular to the main extension plane of the cooktop 10a. As an alternative, it is conceivable that a further first coil portion comprises an arbitrary other number of windings and/or layers. Moreover, a further first coil portion might be formed as a solenoid. The first inductor 12a further comprises a first connection portion 17a (cf. FIG. 5). The first connection portion 17a electrically connects the first coil portion 14a and the further first coil portion 16a. In the present case, the first coil portion 14a and the further first coil portion 16a are connected in series via the first connection portion 17a. The first connection portion 17a is thereby located in a center of the first coil portion 14a and the further first coil portion 16a. The first connection portion 17a comprises two first connectors 46a and a first connection line 48a. As an alternative, it is conceivable to form a first connection portion integrally with a first coil portion and/or a further first coil portion.

The induction hob device comprises a second inductor 18a. The second inductor 18a is assigned to a second group of the groups of inductors 12a, 18a, 28a. The second inductor 18a is directly adjacent to the first inductor 12a at least when seen in the direction perpendicular to the main extension plane of the cooktop 10a. The second inductor 18a comprises a second coil portion 20a. The second coil portion 20a is formed as a spiral coil. The second coil portion 20a is at least substantially circular at least when seen in the direction perpendicular to the main extension plane of the cooktop 10a. The second coil portion 20a comprises seven windings in one layer. The second coil portion 20a is at least substantially identical to the first coil portion 14a and the further first coil portion 16a. As an alternative, it is conceivable that a second coil portion comprises an arbitrary other number of windings and/or layers. Moreover, a second coil portion might be formed as a solenoid. Moreover, the second inductor 18a comprises a further second coil portion 22a. The further second coil portion 22a is formed as a spiral coil. The further second coil portion 22a is at least substantially circular at least when seen in the direction perpendicular to the main extension plane of the cooktop 10a. The further second coil portion 22a comprises seven windings in one layer. The further second coil portion 22a is at least substantially identical to the first coil portion 14a, the further first coil portion 16a and the second coil portion 20a. In the present case, the further second coil portion 22a is flipped and/or mirrored relative to the second coil portion 20a, in particular with respect to a plane which is parallel to the main extension plane of the cooktop 10a, in particular in order to maintain a sense of a current flow. The further second coil portion 22a is located below the second coil portion 20a, in particular with respect to the cooktop 10a. Thereby, the further second coil portion 22a is at least substantially covered by the second coil portion 20a at least in a direction perpendicular to the cooktop 10a and/or at least when seen in the direction perpendicular to the main extension plane of the cooktop 10a. As an alternative, it is conceivable that a further second coil portion comprises an arbitrary other number of windings and/or layers. Moreover, a further second coil portion might be formed as a solenoid. The second inductor 18a further comprises a second connection portion 23a (cf. FIG. 8). The second connection portion 23a electrically connects the second coil portion 20a and the further second coil portion 22a. In the present case, the second coil portion 20a and the further second coil portion 22a are connected in series via the second connection portion 23a. The second connection portion 23a is thereby located in a center of the second coil portion 20a and the further second coil portion 22a. The second connection portion 23a comprises two second connectors and a second connection line (not shown). The second connection portion 23a is at least substantially identical to the first connection portion 17a. As an alternative, it is conceivable to form a second connection portion integrally with a second coil portion and/or a further second coil portion.

Moreover, the second coil portion 20a and the further second coil portion 22a are located below the first coil portion 14a in particular with respect to the cooktop 10a. The second coil portion 20a and the further second coil portion 22a are located above the further first coil portion 16a, in particular with respect to the cooktop 10a. Thereby, the second coil portion 20a and the further second coil portion 22a are at least partly located between the first coil portion 14a and the further first coil portion 16a at least when seen in the direction perpendicular to the main extension plane of the cooktop 10a. In the present case, the second coil portion 20a is located directly adjacent to the first coil portion 14a, in particular at least when seen in a direction parallel to the main extension plane of the cooktop 10a. In addition, the further second coil portion 22a is located directly adjacent to the further first coil portion 16a in particular at least when seen in a direction parallel to the main extension plane of the cooktop 10a.

Additionally, the second coil portion 20a and the further second coil portion 22a are substantially displaced with respect to the first coil portion 14a and the further first coil portion 16a at least in a direction parallel to the cooktop 10a. The second coil portion 20a and the further second coil portion 22a are thereby arranged with respect to the first coil portion 14a and the further first coil portion 16a in such a way that a geometric center of the second coil portion 20a and the further second coil portion 22a are distanced from an outer border of the first coil portion 14a and the further first coil portion 16a at least when seen in the direction perpendicular to the main extension plane of the cooktop 10a. An overlapping area between the second coil portion 20a and the first coil portion 14a or the further first coil portion 16a respectively, amounts to about 30% of a total surface area of the second coil portion 20a at least when seen in the direction perpendicular to the main extension plane of the cooktop 10a. In addition, an overlapping area between the further second coil portion 22a and the first coil portion 14a or the further first coil portion 16a respectively, amounts to about 30% of a total surface area of the further second coil portion 22a at least when seen in the direction perpendicular to the main extension plane of the cooktop 10a.

The induction hob device comprises a third inductor 28a. The third inductor 28a is assigned to a third group of the groups of inductors 12a, 18a, 28a. The third inductor 28a is directly adjacent to the first inductor 12a and the second inductor 18a at least when seen in the direction perpendicular to the main extension plane of the cooktop 10a. The third inductor 28a comprises a third coil portion 30a. The third coil portion 30a is formed as a spiral coil. The third coil portion 30a is at least substantially circular at least when seen in the direction perpendicular to the main extension plane of the cooktop 10a. The third coil portion 30a comprises seven windings in one layer. The third coil portion 30a is at least substantially identical to the first coil portion 14a, the further first coil portion 16a, the second coil portion 20a and the further second coil portion 22a. As an alternative, it is conceivable that a third coil portion comprises an arbitrary other number of windings and/or layers. Moreover, a third coil portion might be formed as a solenoid. Moreover, the third inductor 28a comprises a further third coil portion 32a. The further third coil portion 32a is formed as a spiral coil. The further third coil portion 32a is at least substantially circular at least when seen in the direction perpendicular to the main extension plane of the cooktop 10a. The further third coil portion 32a comprises seven windings in one layer. The further third coil portion 32a is at least substantially identical to the first coil portion 14a, the further first coil portion 16a, the second coil portion 20a, the further second coil portion 22a and the third coil portion 30a. In the present case, the further third coil portion 32a is flipped and/or mirrored relative to the third coil portion 30a, in particular with respect to a plane which is parallel to the main extension plane of the cooktop 10a, in particular in order to maintain a sense of a current flow. The further third coil portion 32a is located below the third coil portion 30a, in particular with respect to the cooktop 10a. Thereby, the further third coil portion 32a is at least substantially covered by the third coil portion 30a at least in a direction perpendicular to the cooktop 10a and/or at least when seen in the direction perpendicular to the main extension plane of the cooktop 10a. As an alternative, it is conceivable that a further third coil portion comprises an arbitrary other number of windings and/or layers. Moreover, a further third coil portion might be formed as a solenoid. The third inductor 28a further comprises a third connection portion 33a (cf. FIG. 8). The third connection portion 33a electrically connects the third coil portion 30a and the further third coil portion 32a. In the present case, the third coil portion 30a and the further third coil portion 32a are connected in series via the third connection portion 33a. The third connection portion 33a is thereby located in a center of the third coil portion 30a and the further third coil portion 32a. The third connection portion 33a comprises two third connectors and a third connection line (not shown). The third connection portion 33a is at least substantially identical to the first connection portion 17a. As an alternative, it is conceivable to form a third connection portion integrally with a third coil portion and/or a further third coil portion.

Moreover, the third coil portion 30a and the further third coil portion 32a are located below the first coil portion 14a, in particular with respect to the cooktop 10a. The third coil portion 30a and the further third coil portion 32a are located above the further first coil portion 16a, in particular with respect to the cooktop 10a. Thereby, the third coil portion 30a and the further third coil portion 32a are at least partly located between the first coil portion 14a and the further first coil portion 16a at least when seen in the direction perpendicular to the main extension plane of the cooktop 10a. Additionally, the third coil portion 30a and the further third coil portion 32a are located below the second coil portion 20a, in particular with respect to the cooktop 10a. The third coil portion 30a and the further third coil portion 32a are located above the further second coil portion 22a, in particular with respect to the cooktop 10a. Thereby, the third coil portion 30a and the further third coil portion 32a are at least partly located between the second coil portion 20a and the further second coil portion 22a at least when seen in the direction perpendicular to the main extension plane of the cooktop 10a. In the present case, the third coil portion 30a is located directly adjacent to the second coil portion 20a, in particular at least when seen in a direction parallel to the main extension plane of the cooktop 10a. In addition, the further third coil portion 32a is located directly adjacent to the further second coil portion 22a, in particular at least when seen in a direction parallel to the main extension plane of the cooktop 10a.

Besides, the third coil portion 30a and the further third coil portion 32a are substantially displaced with respect to the first coil portion 14a, the further first coil portion 16a, the second coil portion 20a and the further second coil portion 22a at least in a direction parallel to the cooktop 10a. The third coil portion 30a and the further third coil portion 32a are thereby arranged with respect to the first coil portion 14a, the further first coil portion 16a, the second coil portion 20a and the further second coil portion 22a in such a way that a geometric center of the third coil portion 30a and the further third coil portion 32a are distanced from an outer border of the first coil portion 14a, the further first coil portion 16a, the second coil portion 20a and the further second coil portion 22a at least when seen in the direction perpendicular to the main extension plane of the cooktop 10a. An overlapping area between the third coil portion 30a and the first coil portion 14a or the further first coil portion 16a respectively, amounts to about 30% of a total surface area of the third coil portion 30a at least when seen in the direction perpendicular to the main extension plane of the cooktop 10a. An overlapping area between the third coil portion 30a and the second coil portion 20a or the further second coil portion 22a respectively, amounts to about 30% of a total surface area of the third coil portion 30a at least when seen in the direction perpendicular to the main extension plane of the cooktop 10a. In addition, an overlapping area between the further third coil portion 32a and the first coil portion 14a or the further first coil portion 16a respectively, amounts to about 30% of a total surface area of the further third coil portion 32a at least when seen in the direction perpendicular to the main extension plane of the cooktop 10a. An overlapping area between the further third coil portion 32a and the second coil portion 20a or the further second coil portion 22a respectively, amounts to about 30% of a total surface area of the further third coil portion 32a at least when seen in the direction perpendicular to the main extension plane of the cooktop 10a.

By overlapping the inductors 12a, 18a, 28a a coverage resolution and by that, in particular a flexibility of the induction hob 40a can be advantageously improved, which leads to a particularly uniform power distribution. Thereby, a distance between centers of the inductors 12a, 18a, 28a can be reduced to a minimum.

Moreover, the inductors 12a, 18a, 28a are arranged in such a way that the inductors 12a, 18a, 28a comprise an equal effective distance to the cooktop 10a, which in particular results in a particularly uniform heat distribution and/or thermal distribution, in particular in the cooking utensil 42a. In the present case, the effective distance to the cooktop 10a is between 3 mm and 15 mm.

Figure 6:
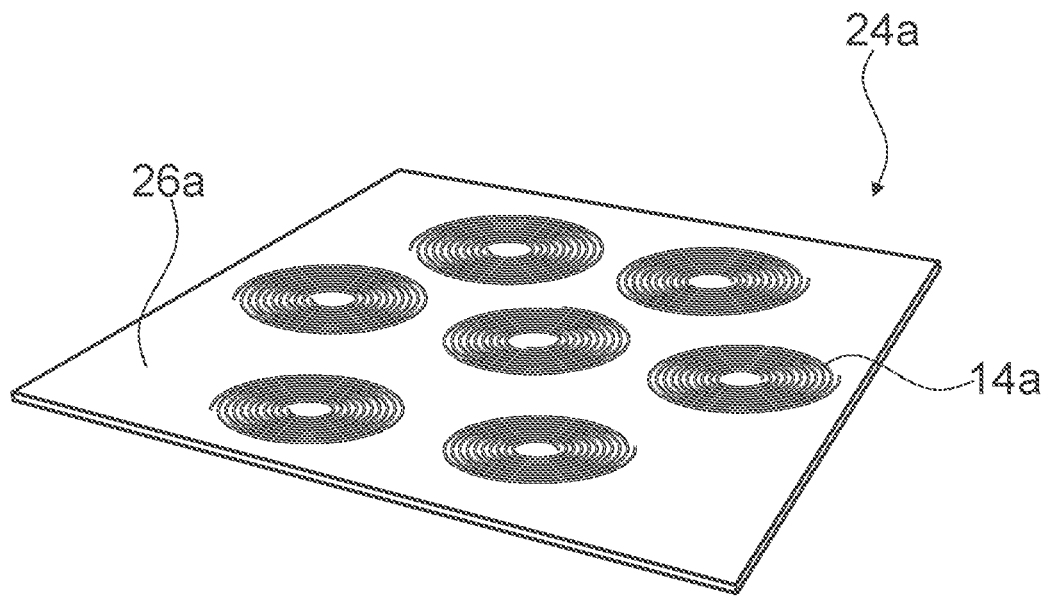
Figure 7:
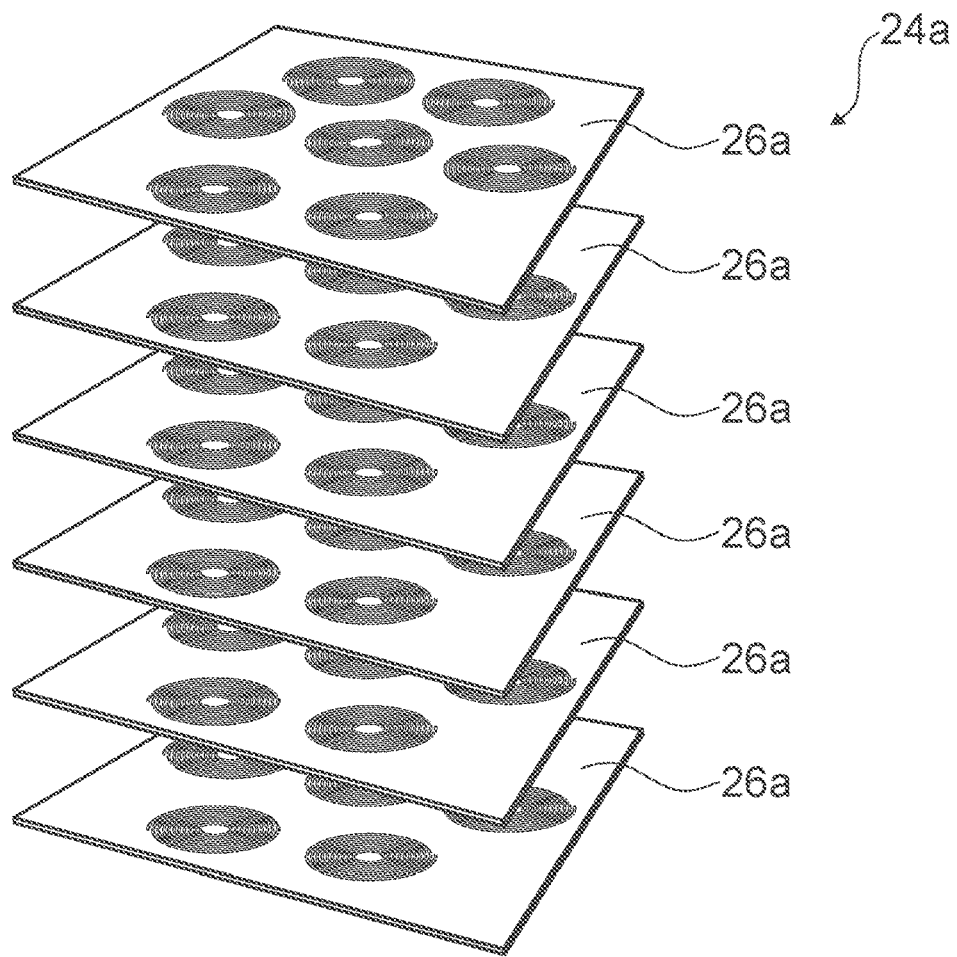
Figure 8:
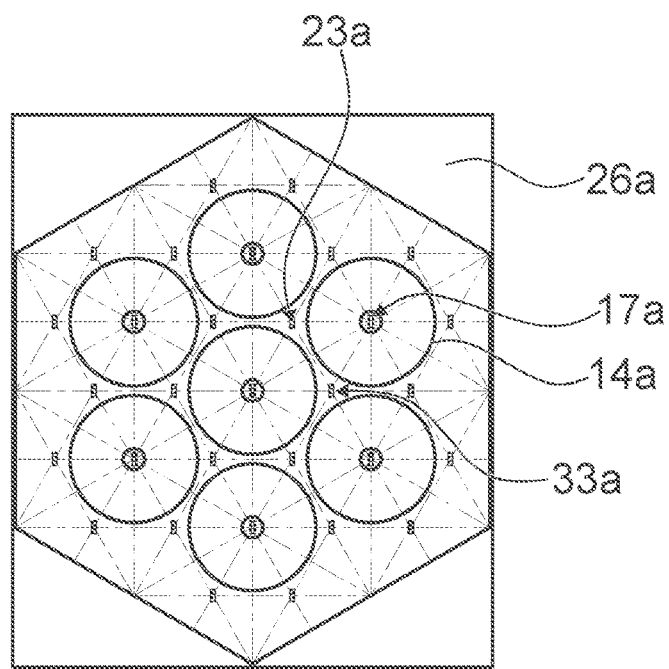

Further, the induction hob device comprises a retainer unit 24a (cf. FIGS. 6 and 7). The retainer unit 24a is provided to support the inductors 12a, 18a, 28a. For this purpose, the retainer unit 24a comprises at least one retainer element 26a. In the present case, the retainer unit 24a comprises at least six, in particular stacked, retainer elements 26a, which in particular are arranged one above the other in an assembled state. The retainer elements 26a are at least substantially identical. The retainer elements 26a are embodied as retainer plates. The retainer elements 26a are embodied as printed circuit board-substrates. Each retainer element 26a is provided to support at least one of the coil portions 14a, 16a, 20a, 22a, 30a, 32a. In the present case, each retainer element 26a is provided to support a plurality of identically constructed coil portions 14a, 16a, 20a, 22a, 30a, 32a by which advantageously costs may be saved. FIG. 6 shows an exemplary retainer element 26a, wherein at least the first coil portion 14a is located on the retainer element 26a. In the assembled state, the retainer elements 26a are flipped, rotated and/or displaced relative to each other in order to form the inductors 12a, 18a, 28a. The connection portions 17a, 23a, 33a of the inductors 12a, 18a, 28a, in particular the connection lines 48a, are at least partly realized by vias in the retainer elements 26a. Thereby, an accurate arrangement scheme for the connection portions 17a, 23a, 33a of all inductors 12a, 18a, 28a is needed. FIG. 8 shows the exemplary retainer element 26a, on which at least the first coil portion 14a is located. Thereby, the first connection portion 17a is located in the center of the first coil portion 14a. The second connection portion 23a and the third connection portion 33a are located in the center and/or barycenter of an equilateral triangle formed by three directly adjacent coil portions 14a located on the retainer element 26a. Hence, an equal construction and/or layout of the retainer elements 26a can be used for all coil portions 14a, 16a, 20a, 22a, 30a, 32a. However, alternatively a similar structure could be obtained using conventional coiled coil portions. Thereby, a retainer element may be formed as a specifically constructed plastic holder. Moreover, it is conceivable that on each surface layer of a retainer element a coil portion is located. Moreover, it is conceivable to use multilayer printed circuit boards, wherein the coil portions may be located at surface layers and intermediate layers.

Figure 9:
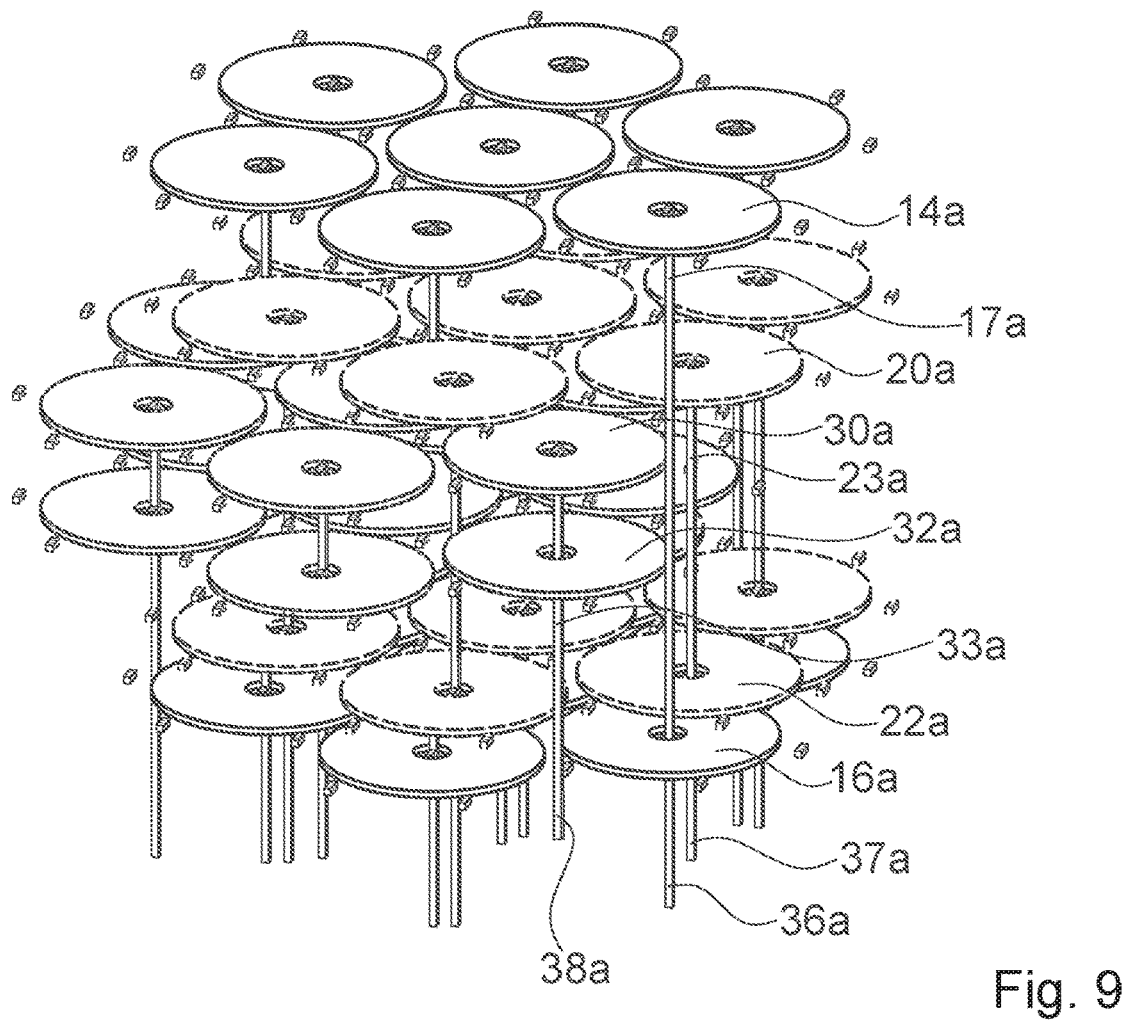
Figure 10:
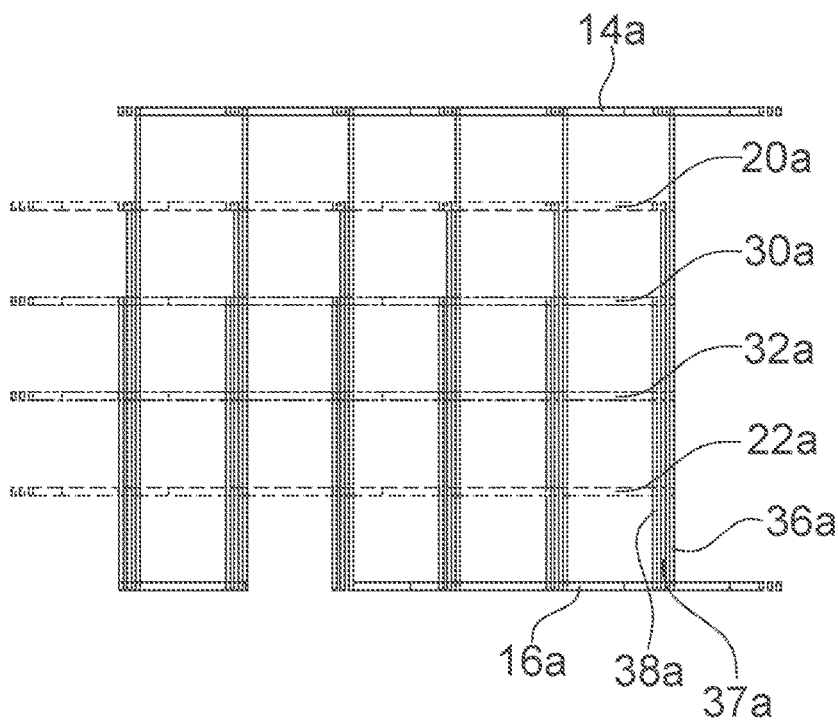
Figure 11:
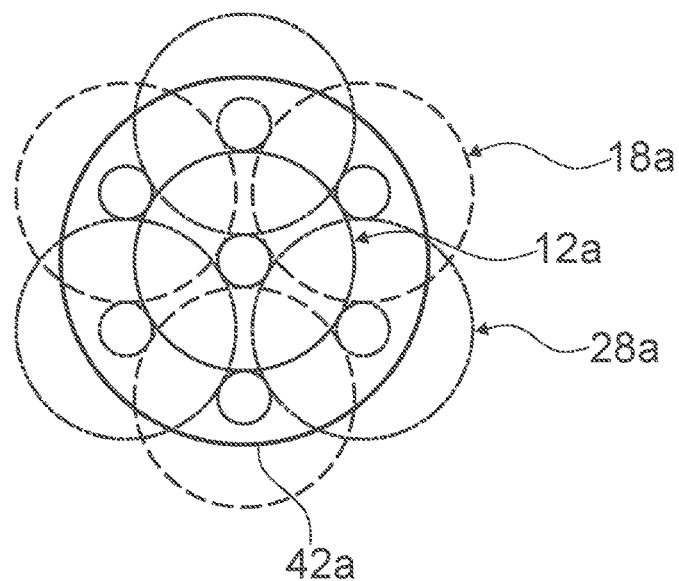

In addition, each inductor 12a, 18a, 28a comprises at least one terminal 36a, 37a, 38a (cf. FIGS. 9 and 10). The terminals 36a, 37a, 38a are used to connect the coil portions 14a, 16a, 20a, 22a, 30a, 32a to a supply unit (not shown). The terminals 36a, 37a, 38a are thereby guided to one side. In the present case, the terminals 36a, 37a, 38a are guided to a side which faces away from the cooktop 10a. Hence, the terminals 36a, 37a, 38a are accessible from the same side. Moreover, the terminals 36a, 37a, 38a are at least partly integrally with the connection portions 17a, 23a, 33a. Hence, the connection portions 17a, 23a, 33a are used to implement a connection between the coil portions 14a, 16a, 20a, 22a, 30a, 32a and to implement the terminals 36a, 37a, 38a.

Figure 12:
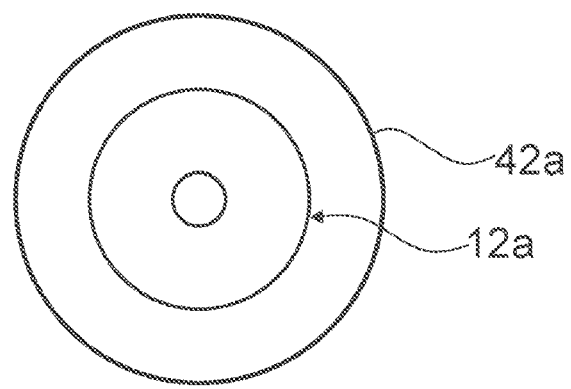
Figure 13:
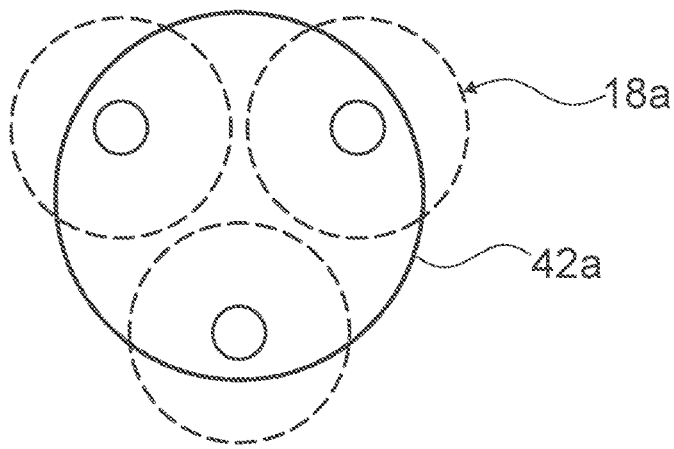
Figure 14:
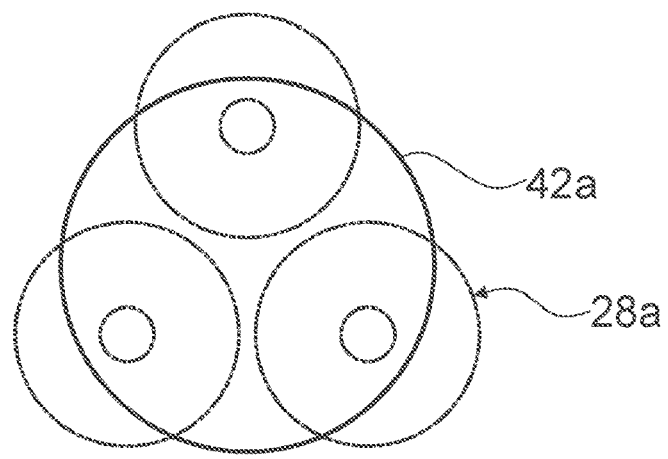

The FIGS. 11 to 14 show different operational states of a control scheme used to supply the cooking utensil 42a. In the present case, the control unit 34a is provided to operate the inductors 12a, 18a, 28a alternately. As a result, an uniform thermal distribution in the cooking utensil 42a can be achieved. Moreover, the control unit 34a is provided to merely operate the inductors 12a, 18a, 28a, which are located at least partly below the cooking utensil 42a. Thereby, FIG. 12 shows a first operational state in which merely the first inductor 12a respectively inductors 12a of the first group of the groups of inductors 12a, 18a, 28a are operated. FIG. 13 shows a second operational state in which merely the second inductor 18a respectively inductors 18a of the second group of the groups of inductors 12a, 18a, 28a are operated and FIG. 14 shows a third operational state in which merely the third inductor 28a respectively inductors 28a of the third group of the groups of inductors 12a, 18a, 28a are operated. As an alternative, it is conceivable that a control unit is provided to operate a first inductor, a second inductor and a third inductor at least temporarily simultaneously.

The FIGS. 15 to 22 show further exemplary embodiments of the invention. The description below and the figures are at least substantially limited to the differences between the exemplary embodiments. Regarding components that are designated in the same way, particularly regarding components having identical reference numerals, reference can be made to the figures and/or the description of the other exemplary embodiment, especially of FIGS. 1 to 14. In order to differentiate the exemplary embodiments, the letter a is added after the reference numerals of the exemplary embodiment in FIGS. 1 to 14. In the exemplary embodiments of FIGS. 15 to 22, the letter a is replaced by the letters b to i.

Figure 15:
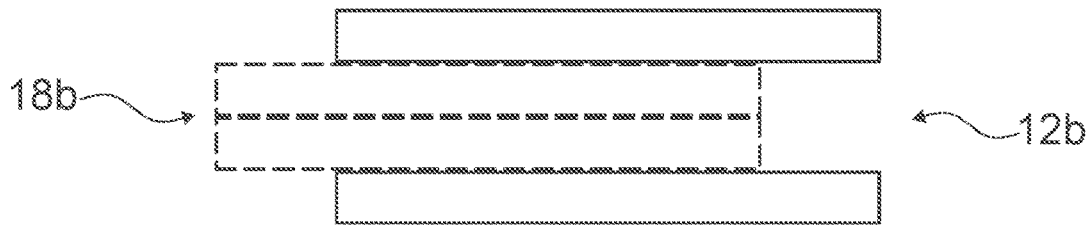

FIG. 15 shows one further embodiment of the invention. The letter b is postposed to the reference numbers of the further embodiment of FIG. 15. The further embodiment of FIG. 15 differs from the previous embodiment at least substantially by a number of groups of different inductors 12b, 18b of an induction hob device.

In the present case, the induction hob device comprises two groups of inductors 12b, 18b, wherein the inductors 12b, 18b, which are assigned to the different groups are at least partly different to each other, in particular differently constructed and/or arranged, in particular in a direction perpendicular to a main extension plane of a cooktop 10b. Inductors 12b of a first group of the groups of inductors 12b, 18b correspond to the second inductor 18a of the previous embodiment while inductors 18b of a second group of the groups of inductors 12b, 18b correspond to the third inductors 28a of the previous embodiment.

Figure 16:
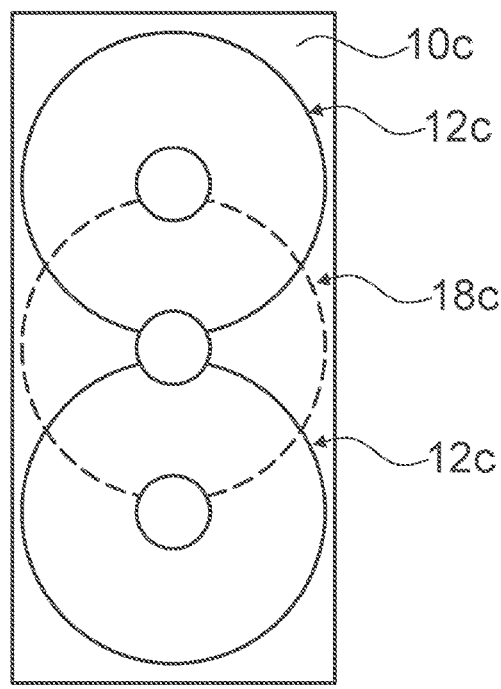

FIG. 16 shows one further embodiment of the invention. The letter c is postposed to the reference numbers of the further embodiment of FIG. 16. The further embodiment of FIG. 16 differs from the previous embodiments at least substantially by a number of inductors 12c, 18c of an induction hob device.

In the present case, the induction hob device comprises exactly three inductors 12c, 18c. The inductors 12c, 18c are associated to two groups of inductors 12c, 18c. Thereby, two inductors 12c are associated to a first group of the groups of inductors 12c, 18c while the remaining inductor 18c is associated to a second group of the groups of inductors 12c, 18c.

Figure 17:
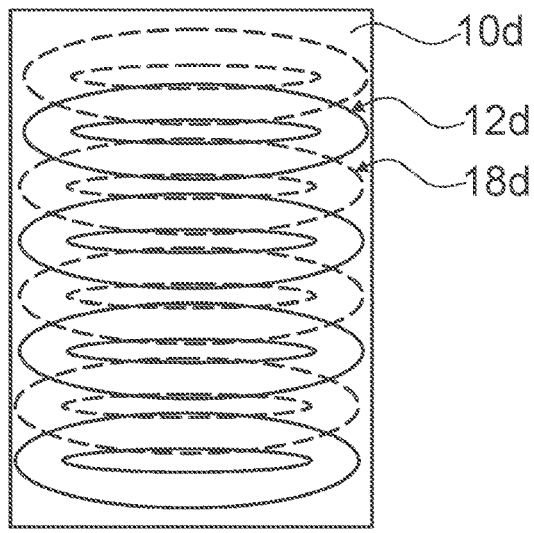

FIG. 17 shows one further embodiment of the invention. The letter d is postposed to the reference numbers of the further embodiment of FIG. 17. The further embodiment of FIG. 17 differs from the previous embodiments at least substantially by a shape of inductors 12d, 18d of an induction hob device.

In the present case, the inductors 12d, 18d are embodied as vector coils. Thereby, at least a first coil portion 14d, a further first coil portion 16d, a second coil portion 20d and a further second coil portion 22d are at least substantially oval and/or elliptic at least when seen in a direction perpendicular to a main extension plane of a cooktop 10d. Moreover, at least directly adjacent inductors 12d, 18d at least when seen in the direction perpendicular to the main extension plane of the cooktop 10d, which in particular are associated to different groups of inductors 12d, 18d, interleave each other, in particular in a direction perpendicular to a longitudinal extension of the inductors 12d, 18d at least when seen in the direction perpendicular to the main extension plane of the cooktop 10d.

Figure 18:
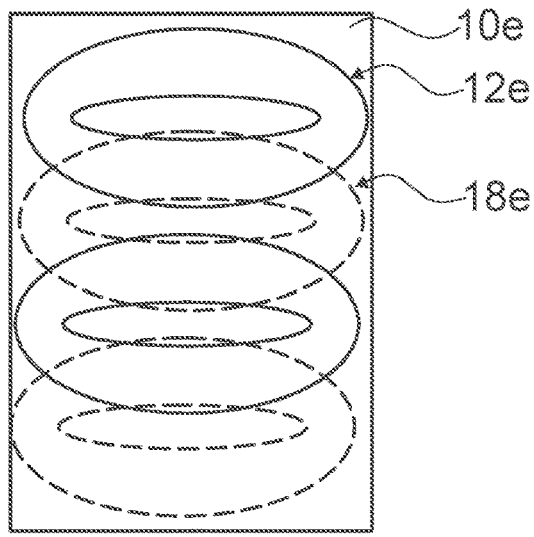

FIG. 18 shows one further embodiment of the invention. The letter e is postposed to the reference numbers of the further embodiment of FIG. 18. The further embodiment of FIG. 18 differs from the previous embodiments at least substantially by a shape of inductors 12e, 18e of an induction hob device.

In the present case, a cooktop 10e corresponds to a cooktop 10d of the previous embodiment. Hence, a width of the inductors 12e, 18e is increased with respect to the inductors 12d, 18d of the previous embodiment.

Figure 19:
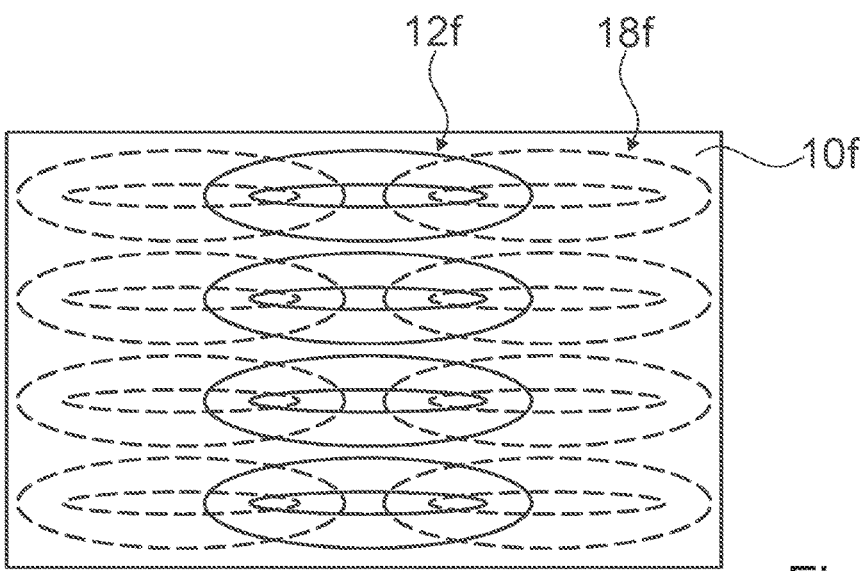

FIG. 19 shows one further embodiment of the invention. The letter f is postposed to the reference numbers of the further embodiment of FIG. 19. The further embodiment of FIG. 19 differs from the previous embodiments at least substantially by an arrangement of inductors 12f, 18f of an induction hob device.

In this case, at least directly adjacent inductors 12f, 18f at least when seen in a direction perpendicular to a main extension plane of a cooktop 10f, which in particular are associated to different groups of inductors 12f, 18f, interleave each other, in particular in a direction parallel to a longitudinal extension of the inductors 12f, 18f at least when seen in the direction perpendicular to the main extension plane of the cooktop 10f.

Figure 20:
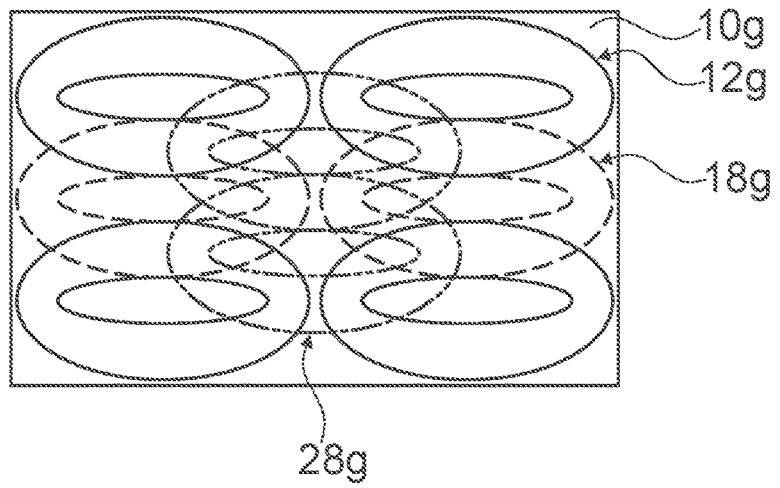

FIG. 20 shows one further embodiment of the invention. The letter g is postposed to the reference numbers of the further embodiment of FIG. 20. The further embodiment of FIG. 20 differs from the previous embodiments at least substantially by a shape of inductors 12g, 18g, 28g of an induction hob device as well as a number of groups of different inductors 12g, 18g, 28g.

In the present case, a cooktop 10g corresponds to a cooktop 10f of the previous embodiment. Hence, a width of the inductors 12g, 18g is increased with respect to the inductors 12f, 18f of the previous embodiment. Additionally, the induction hob device comprises three groups of inductors 12g, 18g, 28g.

Figure 21:
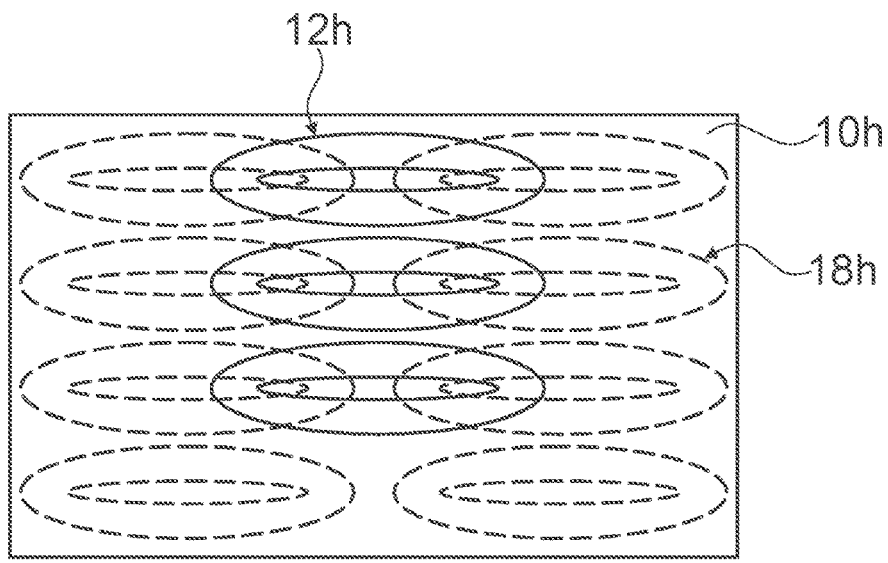

FIG. 21 shows one further embodiment of the invention. The letter h is postposed to the reference numbers of the further embodiment of FIG. 21. The further embodiment of FIG. 21 differs from the previous embodiments at least substantially by a shape and/or arrangement of inductors 12h, 18h of an induction hob device.

In the present case, inductors 12h of a first group of two groups of inductors 12h, 18h, which are located in a central area of a cooktop 18h, merely partly extend over of a total extension of the cooktop 18h.

Figure 22:
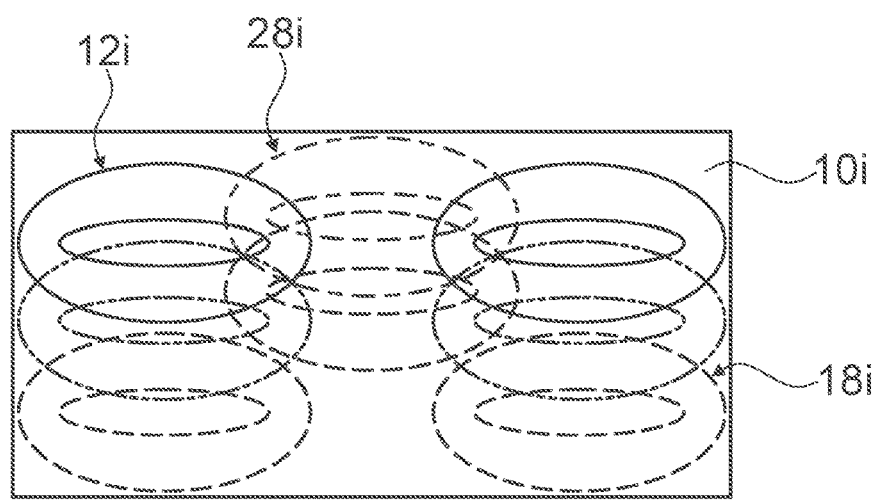

FIG. 22 shows one further embodiment of the invention. The letter i is postposed to the reference numbers of the further embodiment of FIG. 22. The further embodiment of FIG. 22 differs from the previous embodiments at least substantially by a shape of inductors 12i, 18i, 28i of an induction hob device as well as a number of groups of different inductors 12i, 18i, 28i.

In the present case, a cooktop 10i corresponds to a cooktop 10h of the previous embodiment. Hence, a width of the inductors 12i, 18i is increased with respect to the inductors 12h, 18h of the previous embodiment. Additionally, the induction hob device comprises three groups of inductors 12i, 18i, 28i.

The invention claimed is:

1. An induction hob device, comprising:
   a cooktop;
   a first inductor arranged below the cooktop, the first inductor having at least a first coil portion and a further first coil portion; and
   a second inductor arranged below the cooktop, the second inductor having at least a second coil portion and a further second coil portion which are both located, at least partly, between the first coil portion and the further first coil portion, wherein both the second coil portion and the further second coil portion are partially displaced with respect to either the first coil portion or the further first coil portion in a direction parallel to the cooktop.

2. The induction hob device of claim 1, wherein the first coil portion at least partially covers the further first coil portion in a direction perpendicular to the cooktop.

3. The induction hob device of claim 1, wherein the second coil portion is located directly adjacent to either the first coil portion or the further first coil portion.

4. The induction hob device of claim 1, wherein the first coil portion, the further first coil portion, and the second coil portion are identical.

5. The induction hob device of claim 1, further comprising a third inductor including a third coil portion which is located at least partly between the second coil portion and a further second coil portion of the second inductor.

6. The induction hob device of claim 1, further comprising a retainer unit including at least three retainer elements on each of which at least one of the first coil portion, the further first coil portion, and the second coil portion is located, said retainer elements being flipped, rotated and/or displaced relative to each other.

7. The induction hob device of claim 1, wherein the first and second inductors comprise an equal effective distance to the cooktop.

8. The induction hob device of claim 1, further comprising a control unit configured to operate the first and second inductors alternately.

9. The induction hob device of claim 1, wherein the first inductor comprises a first terminal and the second inductor comprises a second terminal, said first and second terminals being accessible from a same side.

10. An induction hob, comprising an induction hob device which includes a cooktop, a first inductor having at least a first coil portion and a further first coil portion, and a second inductor having at least a second coil portion and a further second coil portion which are both located, at least partly, between the first coil portion and the further first coil portion, wherein the second coil portion is at least partially displaced with respect to either the first coil portion or the further first coil portion in a direction parallel to the cooktop.

11. The induction hob of claim 10, wherein the first coil portion at least partially covers the further first coil portion in a direction perpendicular to the cooktop.

12. The induction hob of claim 10, wherein the second coil portion is located directly adjacent to either the first coil portion or the furthest first coil portion.

13. The induction hob of claim 10, wherein the first coil portion, the further first coil portion, and the second coil portion are identical.

14. The induction hob of claim 10, wherein the induction hob device comprises a third inductor including a third coil portion, which is located at least partly between the second coil portion and a further second coil portion of the second inductor.

15. The induction hob of claim 10, wherein the induction hob device comprises a retainer unit including at least three identical retainer elements on each of which at least one of the first coil portion, the further first coil portion, and the second coil portion is located, said retainer elements being flipped, rotated and/or displaced relative to each other.

16. The induction hob of claim 10, wherein the first and second inductors comprise an equal effective distance to the cooktop.

17. The induction hob of claim 10, wherein the induction hob device comprises a control unit configured to operate the first and second inductors alternately.

18. The induction hob of claim 10, wherein the first inductor comprises a first terminal and the second inductor comprises a second terminal, said first and second terminals being accessible from a same side.

19. A method for manufacturing an induction hob device, comprising arranging at least two first coil portions of a first inductor and a second coil portion of a second inductor below a cooktop such that the second coil portion is both at least partly located between the at least two first coil portions and is partially displaced with respect to either of the two first coil portions in a direction parallel to the cooktop.

* * * * *